United States Patent
Yasui et al.

(10) Patent No.: US 8,182,925 B2
(45) Date of Patent: May 22, 2012

(54) ADHESIVE AND LAMINATE PREPARED USING THE ADHESIVE

(75) Inventors: Shigeyuki Yasui, Rye Brook, NY (US); Akihide Mori, Chiba (JP); Seiji Ota, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 902 days.

(21) Appl. No.: 12/083,093

(22) PCT Filed: Oct. 5, 2006

(86) PCT No.: PCT/JP2006/319964
§ 371 (c)(1),
(2), (4) Date: Apr. 4, 2008

(87) PCT Pub. No.: WO2007/040261
PCT Pub. Date: Apr. 12, 2007

(65) Prior Publication Data
US 2009/0110945 A1 Apr. 30, 2009

(30) Foreign Application Priority Data
Oct. 6, 2005 (JP) .................................. 2005-293432

(51) Int. Cl.
*B32B 27/00* (2006.01)
*B32B 27/08* (2006.01)
(52) U.S. Cl. ........................................ 428/500; 428/515
(58) Field of Classification Search .................. None
See application file for complete search history.

(56) References Cited

U.S. PATENT DOCUMENTS

| | | | |
|---|---|---|---|
| 4,900,612 A | 2/1990 | Sato et al. | |
| 2007/0173603 A1* | 7/2007 | Murakami et al. | 525/63 |

FOREIGN PATENT DOCUMENTS

| | | |
|---|---|---|
| EP | 1 728 803 A1 | 12/2006 |
| EP | 1 860 169 A1 | 11/2007 |
| JP | 55-137176 | 10/1980 |
| JP | 61-270155 | 11/1986 |
| JP | 62-158043 | 7/1987 |
| JP | 2002-264281 | 9/2002 |
| JP | 2002-273838 | 9/2002 |
| JP | 2003-64334 | 3/2003 |
| JP | 2004-204207 | 7/2004 |
| JP | 2005-60592 | 3/2005 |
| JP | 2005-307157 | 11/2005 |
| WO | WO 2006/098290 A1 | 9/2006 |

OTHER PUBLICATIONS

European Search Report dated Nov. 24, 2009 received in corresponding European Application No. 06811302.6.

* cited by examiner

*Primary Examiner* — Sheeba Ahmed
(74) *Attorney, Agent, or Firm* — Foley & Lardner LLP

(57) ABSTRACT

It is an object of the invention to provide a carbodiimide modified polyolefin adhesive having excellent adhesive strength in a room temperature atmosphere and excellent adhesive strength in a high temperature atmosphere even in continuously molding with a practical molding machine. An adhesive (D), i.e., a carbodiimide modified polyolefin adhesive of the present invention which can solve the above problem is obtainable by allowing a polyolefin (A) having a group capable of reacting with a carbodiimide group to react with a carbodiimide group-containing compound (B) in the presence of an unmodified polyolefin (C) and having a ratio of a peak intensity at 2130 to 2140 cm$^{-1}$ to a peak intensity at 1470 cm$^{-1}$, as determined by infrared absorbance analysis, of not more than 60% and a density of 0.870 g/cm$^3$ to 0.920 g/cm$^3$. Furthermore, the use of the adhesive provides a laminate of a polar resin (F) and a polyolefin (G) having excellent interlaminar adhesive force both under a room temperature atmosphere and under a high temperature atmosphere.

4 Claims, No Drawings

ADHESIVE AND LAMINATE PREPARED USING THE ADHESIVE

TECHNICAL FIELD

The present invention relates to a new adhesive and a laminate prepared by using the adhesive.

More specifically, the present invention relates to an adhesive (D) obtainable by allowing a polyolefin (A) having a group capable of reacting with a carbodiimide group to react with a carbodiimide group-containing compound (B) in the presence of an unmodified polyolefin (C), and it relates to a laminate of polar resins (F) and/or a polyolefin (G) prepared using the adhesive.

BACKGROUND ART

It is known that graft modified ethylene/α-olefin random copolymer compositions grafted with an unsaturated carboxylic acid or its derivative are used as a bonding composition for polar resins having difficulty in bonding with polyesters such as polyethylene terephthalate, etc or polyolefins such as polycarbonate, etc (see Patent Documents 1 and 2). These ethylene type modified resin compositions have excellent adhesion properties at ordinary temperature. These compositions, however, have a problem in that adhesive force is greatly lowered in a high temperature atmosphere, for example, in handling a laminate with polyethylene terephthalate at high temperatures or in a hot water, to cause delamination.

As an adhesive resin composition having improved adhesion strength in a high temperature region, an adhesive resin composition made of a modified polyolefin resin composition is known now (see Patent Document 3). The resin composition, however, is insufficient in adhesive strength at room temperature and at high temperatures in continuously molding with a practical molding machine and thereby cannot satisfy the use under wide conditions from room temperature to high temperatures.

Patent document 1: JP-A-S61(1986)-270155
Patent document 2: JP-A-S62(1987)-158043
Patent document 3: JP-A-22002-273838

DISCLOSURE OF THE INVENTION

Object of the Invention

It is an object of the invention to provide a carbodiimide modified polyolefin adhesive having excellent adhesive strength in a room temperature atmosphere and excellent adhesive strength in a high temperature atmosphere even in continuously molding with a practical molding machine and it is another object of the invention to provide a laminate made from the polymer composition which laminate has excellent interlaminar adhesive force in a room temperature atmosphere and in a high temperature atmosphere.

Means for Solving the Object

The present inventors have been earnestly studied and found that using an adhesive (D) obtainable by allowing a polyolefin (A) having a group capable of reacting with a carbodiimide group to react with a carbodiimide group-containing compound (B) in the presence of an unmodified polyolefin (C) and having a ratio of a peak intensity at 2130 to 2140 cm$^{-1}$ to a peak intensity at 1470 cm$^{-1}$, as determined by infrared absorbance analysis, of not more than 60% and a density of 0.870 g/cm$^3$ to 0.920 g/cm$^3$, a lowered adhesive force in a high temperature atmosphere can be prevented effectively even in continuously molding with a practical molding machine. Thus, the present invention has been accomplished.

That is to say, the adhesive (D) of the present invention is an adhesive obtainable by allowing a polyolefin (A) having a group capable of reacting with a carbodiimide group to react with a carbodiimide group-containing compound (B) in the presence of an unmodified polyolefin (C) and having a ratio of a peak intensity at 2130 to 2140 cm$^{-1}$ to a peak intensity at 1470 cm$^{-1}$, as determined by infrared absorbance analysis, of not more than 60% and a density of 0.870 g/cm$^3$ to 0.920 g/cm$^3$.

The laminate of the present invention is a laminate of a polar resin (F) and a polyolefin (G) through at least one layer of the carbodiimide modified polyolefin adhesive (D) or a multi-layered laminate obtainable by adhering at least two polar resins (F) through at least one layer of the carbodiimide modified polyolefin adhesive (D).

Effect of the Invention

The carbodiimide modified polyolefin adhesive (D) of the present invention has excellent adhesion properties in a high temperature atmosphere even in molding with a practical molding machine continuously. The use of the carbodiimide modified polyolefin adhesive (D) according to the invention can prepare a laminate having excellent interlaminar adhesive force in a high temperature atmosphere.

BEST MODE FOR CARRYING OUT THE INVENTION

The present invention will be described in detail below.

The carbodiimide modified polyolefin adhesive (D) of the present invention is an adhesive obtainable by allowing a polyolefin (A) having a group capable of reacting with a carbodiimide group to react with a carbodiimide group-containing compound (B) in the presence of an unmodified polyolefin (C) and having a ratio of a peak intensity at 2130 to 2140 cm$^{-1}$ to a peak intensity at 1470 cm$^{-1}$, as determined by infrared absorbance analysis, of not more than 60% and a density of 0.870 g/cm$^3$ to 0.920 g/cm$^3$.

Each component will be described below.

Polyolefin (A) Having a Group Capable of Reacting with a Carbodiimide Group

The polyolefin (A) having a group capable of reacting with a carbodiimide group used in the invention is obtainable by introducing a compound (a) having a group capable of reacting with a carbodiimide group to a polyolefin.

The compound (a) having a group capable of reacting with a carbodiimide group comprises a compound having an active hydrogen-containing group reactive with a carbodiimide group, such as compounds having a group derived from carboxylic acid, amine, alcohol or thiol. Among the compounds, the compounds having a group derived from a carboxylic acid are preferably used, and particularly, the compounds having a group derived from an unsaturated carboxylic acid and/or derivative thereof are preferably used. Furthermore, except for the compounds having an active hydrogen-containing group, a compound having a group easily convertible into an active hydrogen-containing group by water or the like is also preferably used and examples are compounds having an epoxy group or glycidyl group. In the present invention, the compounds (a) having a group capable of reacting with a carbodiimide group may be used singly or in combination.

When an unsaturated carboxylic acid and/or its derivative are used as the compound (a) having a group capable of reacting with a carbodiimide group, examples are an unsaturated compound having at least one carboxylic acid group, an unsaturated compound having at least one carboxylic anhydride group and their derivatives. Examples of the unsaturated group are vinyl group, vinylene group and unsaturated cyclic hydrocarbon group. Specific examples of the compounds are unsaturated carboxylic acids such as acrylic acid, methacrylic acid, maleic acid, fumaric acid, tetrahydrophthalic acid, itaconic acid, citraconic acid, crotonic acid, isocrotonic acid, norbornene dicarboxylic acid, bicyclo[2,2,1]hepto-2-ene-5,6-dicarboxylic acid, their acid anhydrides and derivatives such as acid hydride, amide, imide or ester. More specific examples are malenyl chloride, malenyl imide, maleic anhydride, itaconic anhydride, citraconic anhydride, tetrahydrophthalic anhydride, bicyclo[2,2,1]hept-2-ene-5,6-dicarboxylic anhydride, dimethyl maleate, monomethyl maleate, diethyl maleate, diethyl fumarate, dimethyl itaconate, diethyl citraconate, dimethyl tetrahydrophthalate, dimethyl bicyclo[2,2,1]hept-2-ene-5,6-dicarboxylate, hydroxyethyl (meth)acrylate, hydroxypropyl (meth)acrylate, glycidyl (meth)acrylate, aminoethyl methacrylate and aminopropyl methacrylate.

When an unsaturated carboxylic acid and/or its derivative are used as the compound (a) having a group capable of reacting with a carbodiimide group, they may be used singly or may be combined to use. Among them, maleic anhydride, (meth)acrylic acid, itaconic anhydride, citraconic anhydride, tetrahydrophthalic anhydride, bicyclo[2,2,1]hept-2-ene-5,6-dicarboxylic anhydride, hydroxyethyl (meth)acrylate, glycidyl (meth)acrylate and aminopropyl methacrylate are preferred. Particularly, dicarboxylic acid anhydrides such as, maleic anhydride, itaconic anhydride, citraconic anhydride, tetrahydrophthalic anhydride and bicyclo[2,2,1]hept-2-ene-5,6-dicarboxylic acid anhydride are preferred.

As a method for introducing the compound (a) having a group capable of reacting with a carbodiimide group into polyolefins, it is possible to employ a known method, for example, a method of graft copolymerization of the compound (a) having a group capable of reacting with a carbodiimide group on a polyolefin main chain or a method of radical copolymerization of the compound (a) having a group capable of reacting with a carbodiimide group with an olefin.

The methods for graft copolymerization and radical copolymerization are described in detail respectively below.

<Graft Copolymerization>

The polyolefin (A) having a group reacting with a carbodiimide group according to the invention can be prepared by graft copolymerization of the compound (a) having a group capable of reacting with a carbodiimide group on a polyolefin main chain.

(Polyolefin Main Chain)

The polyolefin used as a polyolefin main chain is a polymer which comprises an aliphatic α-olefin having 2 to 20 carbon atoms, a cyclic olefin and a non-conjugated diene as main components, preferably a polymer which comprises an α-olefin having 2 to 10 carbon atoms, more preferably an α-olefin having 2 to 8 carbon atoms as a main component. The olefins may be used singly or combined to use. The amount of the olefins as a comonomer is usually not more than 50 mol %, preferably not more than 40 mol % and furthermore preferably not more than 30 mol %. In the present invention, it is preferred to use a homopolymer or copolymer of ethylene, propylene, 1-butene, 4-methyl-1-pentene, 3-methyl-1-butene, 1-hexene, 1-octene, tetracyclododecene and norbornene. Furthermore, both of those having an isotactic structure and those having a syndiotactic structure can be used and they do not have exceptional limitation on stereo-regularity thereof.

The polyolefin used for graft modification has a density of usually from 0.8 to 1.1 g/cm$^3$, preferably 0.9 to 1.05 g/cm$^3$, more preferably 0.9 to 1.0 g/cm$^3$, and a melt flow rate (MFR), as determined by ASTM D 1238 at 190° C. under a load of 2.16 kg, of usually from 0.01 to 500 g/10 min, preferably 0.05 to 200 g/10 min, more preferably 0.1 to 100 g/10 min. If the density and the MFR are in the above ranges, it is easy to handle them because the grafted copolymers after modification have the same density and MFR as those of the polyolefin.

The polyolefin used for graft modification has a crystallinity of usually at least 2%, preferably at least 5%, more preferably at least 10%. If the crystallinity is in the above range, the grafted copolymers after modification have excellent handling properties.

The polyolefin used for graft modification has a number average molecular weight, as measured by gel permeation chromatography (GPC), of preferably 5000 to 500000, more preferably 10000 to 100000. If the number average molecular weight (Mn) is in the above range, it has excellent handling properties. With regard to ethylene polyolefins, if the comonomer content is not more than 10 mol %, the number average molecular weight is determined using polyethylene standards and if the comonomer content is not less than 10 mol %, it is determined using ethylene-propylene standards (ethylene content of 70 mol %).

The production of the polyolefin can be carried out by any one of known processes. For example, it can be prepared by polymerization using a titanium catalyst, vanadium catalyst or metallocene catalyst. The polyolefin used for the graft modification may be in a resinous state or an elastomeric state and may have an isotactic structure or syndiotactic structure and does not have particular limitation on stereo-regularity. Commercially available resins can be used as they are.

(Process For Graft Polymerization)

In the preparation of the polyolefin (A) having a group capable of reacting with a carbodiimide group with the graft polymerization according to the present invention, a compound having a group capable of reacting with a carbodiimide group and optionally other ethylenically unsaturated monomers are graft-copolymerized on an olefin, which makes a graft main chain, in the presence of a radical initiator.

The process for grafting the compound having a group capable of reacting with a carbodiimide group on a polyolefin main chain is not particularly limited, for example, it is possible to employ a solution process, a melt kneading process or other known graft polymerization processes.

<Radical Polymerization>

The polyolefin (A) having a group capable of reacting with a carbodiimide group according to the present invention can be also prepared by radical polymerization of an olefin and a compound (a) having a group capable of reacting with a carbodiimide group. Examples of the olefin may be the same olefins used in the formation of the olefin, which makes a graft main chain, and examples of the compound (a) having a group capable of reacting with a carbodiimide group may be also the same as the above.

The process for copolymerizing an olefin and the compound having a group capable of reacting with a carbodiimide group is not particularly limited and conventionally known radical copolymerization processes can be used.

Process for Producing Polyolefin (A) Having a Group Capable of Reacting with a Carbodiimide Group The polyolefin (A) having a group capable of reacting with a carbodiimide group has a content of the compound (a) having a group capable of reacting with a carbodiimide group of usually 0.1 to 10 wt %, preferably 0.1 to 3.0 wt %, more preferably 0.1 to 2.0 wt %. When the content of the compound (a) having a group capable of reacting with a carbodiimide group is over the above range, the compound (a) is crosslinked with the carbodiimide group-containing compound (B) and thereby the preparation of the adhesive (D) is sometimes difficult.

The polyolefin (A) having a group capable of reacting with a carbodiimide group has a density of usually 0.915 to 0.980 g/cm$^3$, preferably 0.920 to 0.970 g/cm$^3$, more preferably 0.925 to 0.965 g/cm$^3$. The density was measured based on JIS K7112.

Among the polyolefins (A), maleic anhydride grafted copolymers of a crystalline polyolefin such as polyethylene, polypropylene, polybutene-1, poly-4-methyl pentene-1 and copolymers of these α-olefins are preferred and further maleic anhydride grafted copolymers of polyethylene are preferred. The maleic anhydride grafted copolymers of polyethylene having a density of not less than 0.915 g/cm$^3$ are particularly preferred. When the polyolefin (A) having a group capable of reacting with a carbodiimide group has a low density and low crystallinity, the resulting adhesion strength is apt to be low in the high-temperature peeling test. The polyolefin (A) having a group capable of reacting with a carbodiimide group preferably has a high density.

Carbodiimide Group Containing Compound (B)

The carbodiimide group containing compound (B) used in the invention is a polycarbodiimide having a repeating unit represented by the following formula (4).

—N═C═N—R1-     (4)

In the formula (4), R1 is a bivalent organic group of 2 to 40 carbon atoms.

The polycarbodiimide can be prepared by subjecting an organic diisocyanate such as aliphatic diisocyanate, aromatic diisocyanate or alicyclic diisocyanate to condensation reaction with decarboxylation in the presence of a condensation catalyst in no solvent or in an inert solvent. For example, diisocyanates such as hexamethylene diisocyanate, 4,4-diphenylmethane diisocyanate, 1,4-phenylene diisocyanate, 2,4-tolylenediisocyanate, xylenediisocyanate, cyclohexane-1,4-diisocyanate, dicyclohexylmethane-4,4'-diisocyanate or isophorone diisocyanate may be used singly or plural ones may be mixed for use. In the condensation reaction with decarboxylation, the polymerization degree of polycarbodiimides can be regulated by selecting a catalyst, a reaction temperature or a terminating agent. The polycarbodiimide used herein has a polymerization degree of usually 2 to 40, preferably 4 to 20. Usable examples of the terminating agent may include monoisocyanates such as phenyl isocyanate, tolyl isocyanate or naphthyl isocyanate; and active hydrogen compounds such as methanol, ethanol, diethyl amine, cyclohexyl amine, succinic acid, benzoic acid or ethyl mercaptan. Usable examples of the condensation catalyst may include alcoholates such as titanium, hafnium, zirconium, sodium or calcium; and organic phosphoric acid compounds such as phospholene oxide.

The carbodiimide group-containing compound (B) used in the invention has a number average molecular weight (Mn), as determined by gel permeation chromatography (GPC) relative to polystyrene standards, of usually 400 to 500000, preferably 700 to 10000, more preferably 1000 to 4000. The number average molecular weight is preferably in the above range because the resulting adhesive (D) has excellent adhesive strength.

In the carbodiimide group-containing compound (B) used in the invention, the polycarbodiimide may contain a monocarbodiimide and single or plural compounds may be mixed for use.

Furthermore, it is possible to use commercially available carbodiimide group-containing compounds as they are. Examples thereof are CARBODILITE HMV-8CA and LA1 manufactured by NISSHINBO INDUSTRIES, INC.

In the carbodiimide group-containing compound (B) and the resulting adhesive (D), the carbodiimide group content can be measured by C-NMR, IR or a titrimetric method and can be determined by a carbodiimide equivalent. In the C-NMR, the peak can be observed at 130 to 142 ppm. In the IR, the peak can be observed at 2130 to 2140 cm$^{-1}$.

Unmodified Polyolefin (C)

The unmodified polyolefins (C) used in the invention may be the same as described in the main chain of the polyolefin (A). They can be selected according to the purpose for use and the kind of an adherend. Examples are low-density polyethylenes, high-density polyethylenes, linear low-density polyethylenes, polypropylene, ethylene-propylene copolymer, ethylene-α-olefin copolymer, ethylene-propylene copolymer, ethylene-butene copolymer, ethylene-hexene copolymer, ethylene-octene copolymer, polybutene-1, poly-4-methyl-a-pentene, poly-3-methyl-1-butene and and cyclic polyolefins such as ethylene-tetracyclododecene copolymer. Furthermore, it is also preferred to use those obtainable by adding, to the above copolymers, a non-conjugated diene such as 5-ethylidene norbornene, 5-methyl norbornene, 5-vinyl norbornene, dicyclopentadiene or 1,4-pentadiene as a third component, i.e. ethylene-propylene-non-conjugated diene copolymer rubber (EPDM) and ethylene-propylene-butene ternary polymer rubber. These may be used singly or several kinds thereof may be mixed for use.

In the use at a high temperature of near 100° C. or the use such that adhesives are directly contacted with a substance capable of swelling a polyolefin such as gasoline or oil, it is desired to use polyolefins having a high melting point and high crystallinity such as polypropylene, high-density polyethylene or linear low density polyethylene.

The production of the above polyolefin can be carried out by any one of conventionally known processes. For example, the polyolefin can be polymerized using a titanium catalyst, vanadium catalyst or metallocene catalyst.

The polyolefin used in the graft modification may be in a resinous state or in a elastomeric state, and may have an isotactic structure or a syndiotactic structure. The polyolefin, further has no particular limitation on stereo-regularity. Commercially available resins can be used, as they are, for the polyolefins.

Adhesive (D)

The adhesive (D) of the present invention is obtainable by allowing the polyolefin (A) having a group capable of reacting with a carbodiimide group to react with the carbodiimide group-containing compound (B) in the presence of the unmodified polyolefin (C) preferably at a temperature of not lower than 230° C. Specifically, the adhesive (D) can be prepared by melt kneading them with melt modification, however, the preparation thereof is not limited by this process. In the melt-kneading, the blending ratio of (A) to (C) is preferably 5 to 80 wt %:95 to 20 wt %, more preferably 5 to 60 wt %:95 to 40 wt %.

Examples of the melt mixing process are described below. There is no particular limitation on the process of allowing the polyolefin (A) having a group capable of reacting with a carbodiimide group to react with the carbodiimide group-containing compound (B) in the presence of the unmodified polyolefin (C) preferably at a temperature of not lower than 230° C. For example, the polyolefin (A) having a group capable of reacting with a carbodiimide group, the carbodiimide containing compound (B) and the unmodified polyolefin (C) are simultaneously or successively fed into a Henschel mixer, V-blender, tumbler blender or ribbon blender and kneaded and then melt-kneaded by a single screw extruder, multi-screw extruder, kneader, Banbury mixer to prepare the adhesive. It is preferred to use a device having excellent kneading properties such as multi-screw extruder, kneader or Banbury mixer because a polymer composition in which the components are uniformly dispersed and reacted can be obtained.

Furthermore, it is possible to employ any one of a process for previously mixing the polyolefin (A) having a group capable of reacting with a carbodiimide group, the carbodiimide group-containing compound (B) and the unmodified polyolefin (C) and then feeding them from a hopper and a process for feeding a part of the components from a hopper and feeding the other components from a feeding port provided at a position between the hopper and the tip of an extruder.

The melt kneading of the components can be carried out at a temperature of not lower than the highest melting point among the melting points of the components. Specifically, the melt kneading is carried out at a temperature of usually from 180 to 300° C., preferably 230 to 280° C., more preferably 235 to 270° C.

In the preparation of the adhesive (D) of the present invention, the carbodiimide group-containing compound (B) is fed in such an amount that the amount of the carbodiimide group is usually from 0.1 to 50 mmol, preferably 0.2 to 40 mmol, more preferably 0.5 to 30 mmol based on 100 g of the adhesive (D) prepared by the reaction of the polyolefin (A) having a group capable of reacting with a carbodiimide group and the carbodiimide containing compound (B) in the presence of the unmodified polyolefin (C). The amount of the carbodiimide group is preferably in the above range because the resulting adhesion has excellent adhesion properties and the crosslinking with the polyolefin (A) can be depressed.

The adhesive (D), further, is prepared by reacting the carbodiimide group (NCN) in the polycarbodiimide with the compound (a) having a group capable of reacting with a carbodiimide group. During the reaction, a certain amount of carbodiimide groups is used up and the carbodiimide group residues linked to the polyolefin group as the same molecular chain contribute to adhesion with the polar resin (E). The amount of the carbodiimide group residues is attributable to contraction vibration of N=C=N group at 2130 to 2140 $cm^{-1}$ measured by IR and can be determined by the intensity of the peak. The peak intensity is preferably not more than 60% of the value (percentage) of an internal standard peak at 1470 $cm^{-1}$ resulted from $CH^2$ scissoring deformation vibration of polyolefin, more preferably not more than 50%. When the peak intensity is over the range, there are excess amounts of liberated carbodiimide groups to the polyolefin (A) having a group capable of reacting with a carbodiimide group and therefore the adhesion properties and molding processability are lowered.

In the adhesive (D) of the invention, at least two polyolefins, namely the polyolefin (A) having a group capable of reacting with a carbodiimide group and the unmodified polyolefins (C) are used. Polyolefins having the same composition and the same density may be used or completely different kinds of polyolefins may be used. Examples of the combination thereof may include (A) modified high density polyethylene-(C) high density polyethylene, (A) modified linear low density polyethylene-(C) linear low density polyethylene, (A) modified high density polyethylene-(C) linear low density polyethylene, (A) modified high density polyethylene-(C) ethylene elastomers such as ethylene-butene copolymer or ethylene-propylene copolymer, (A) modified isotactic homopolypropylene-(C) isotactic random polypropylene, (A) modified isotactic random polypropylene-(C)isotactic random polypropylene, (A) modified isotactic homopolypropylene-(C)propylene elastomers such as propylene-ethylene copolymer, (A) modified isotactic random polypropylene-(C) ethylene elastomers such as ethylene-butene copolymer or ethylene-propylene copolymer and (A) modified isotactic random polypropylene-(C) syndiotactic homopolypropylene.

The adhesive (D), in particular, has a density of preferably from 0.870 to 0.920 $g/cm^3$, more preferably 0.890 to 0.920 $g/cm^3$. When the density is in the above range, the resulting adhesive has excellent properties free from lowering of adhesion strength at high temperatures. The density was measured based on JIS K7112.

Preferable examples of the combination of the polyolefins (A) and (C) for preparing the adhesive are a combination of 10 wt % of (A) a modified linear low density polyethylene having a density of 0.922 $g/cm^3$, 80 wt % of (C1) an ethylene elastomer having a density of 0.885 $g/cm^3$ and 10 wt % of (C2) a high density polyethylene having a density of 0.963 $g/cm^3$, and a combination of 10 wt % of (A) a modified high density polyethylene having a density of 0.963 $g/cm^3$, 45 wt % of (C3) a linear low density polyethylene having a density of 0.922 $g/cm^3$ and 45 wt % of an ethylene elastomer having a density of 0.885 $g/cm^3$.

The adhesive (D) has a flexural modulus of preferably from 70 to 180 MPa, more preferably 90 to 170 MPa. The adhesive having a flexural modulus in the above range can have excellent properties with no lowering in adhesion strength at high temperatures. The flexural modulus was measured using a 4 μm thick press sheet based on JIS K7171.

To the adhesive (D), known process stabilizers, heat resistant stabilizers, heat resistant antioxidants and fillers can be added within not missing the object of the invention.

In the adhesive (D) of the invention, the carbodiimide groups are grafted on the main chain of the polyolefin polymer, still they have reactivity with active hydrogen in carbonic acid, amine, alcohol or thiol. Therefore, the adhesive (D) is effective for the polar resin (F) having active hydrogen and the polyolefin (G) or at least two kinds of the polar resins (F).

Tackifier (E)

In the present invention, a so-called tackifier is preferably added in order to give tackiness in particular. Examples of the substance capable of giving tackiness are rosin derivatives, terpene resins, petroleum resins and hydrides thereof. Among them, a hydrated terpene resin and a hydrated petroleum resin are preferable. The tackifier is preferably blended in an amount of from 0 to 30 wt % in the adhesive (D).

To the adhesive (D), it is possible to add modified resins having a group capable of reacting with a carbodiimide group. Examples are maleic acid-modified resins and imine-modified resins, and specific examples are preferably a maleic acid-modified ethylene butene copolymer, maleic acid-modified ethylene propylene copolymer, maleic acid-modified ethylene octene copolymer, maleic acid-modified styrene-butene-butene-styrene copolymer, maleic acid-modified styrene-ethylene-butene-styrene copolymer, imine-modified styrene-butene-butene-styrene copolymer and imine-modified styrene-ethylene-butene-styrene copolymer.

Polar Resin (F)

The polar resin (F) used in the present invention is a polymer, which has active hydrogen having reactivity with a carbodiimide group present in the adhesive (D) and has a group derived from carboxylic acid, amine, alcohol or thiol. Examples are polyethers such as polyester, polyamide, polylactic acid, polycarbonate, acrylic resin, polyphenylene oxide, polyethersulfone (PES), acrylonitrile-butadiene-styrene copolymer (ABS), ethylene-vinylalcohol copolymer and polyacetal; active hydrogen-containing modified fluororesin; and polyolefins containing active hydrogen such as polyolefin modified polymers, ethylene-ethyl acrylate copolymer, ethylene-methacrylic acid copolymer and ethylene-vinyl acetate copolymer. The polar resins (F) may be used singly or in combination.

Examples of the polyesters are non-crystalline polyesters such as polyethylene terephthalate, waste polyethylene terephthalate for recycling, polyethylene naphthalate, polytrimethylene terephthalate, polybutylene terephthalate, glycol-modified polyethylene terephthalate and acid-modified polyethylene terephthalate; biodegradable polyester-containing aromatic polyesters such as polybutylene terephthalate adipate and polyethylene terephthalate succinate; lactic acid resins such as polycaprolactam, polyhydroxy butylate, polyglycollic acid and polylactic acid; and biodegradable polyester resins. Further examples are liquid crystal polyesters of whole aromatic or semi-aromatic polyesters and polyarylates. Among them, polyethylene terephthalate, polybutylene terephthalate, polylactic acid and liquid crystal polyesters are preferred.

Examples of polyamides are aliphatic polyamides such as nylon-6, nylon-66, nylon-10, nylon-12 and nylon 46; and aromatic polyamides prepared from aromatic dicarboxylic acid and aliphatic diamine such as nylon-6T and nylon-9T.

Examples of polycarbonates are aromatic bisphenol type polycarbonates such as bisphenol A polycarbonate and bisphenol F polycarbonate; and aliphatic carbonates such as polyethylene carbonate and polytrimethylene carbonate.

Examples of polyacetals are polyformaldehyde (polyoxymethylene), polyacetoaldehyde, polypropion aldehyde and polybutyl aldehyde. Polyformaldehyde is preferable particularly.

The ethylene-vinyl alcohol copolymer preferably comprises a polymerization unit derived from ethylene in an amount of from 20 to 50 mol %, preferably from 25 to 48 mol %. The copolymer can be prepared by saponification of a corresponding ethylene-vinyl acetate copolymer with an ordinary method.

Polyolefin (G)

The polyolefins (G) used in the laminate of the present invention are those described in the unmodified polyolefin (C), and do not have particular limitation.

Multi-Layered Laminate

The laminate of the present invention has a multi-layered laminate obtainable by bonding the polar resin (F) and the polyolefin (G) or at least two kinds of the polar resins (F) through the adhesive (D). The laminate may have any layer structure as long as it satisfies the above requirements.

The laminate of the invention may be prepared by any preparation processes. For example, on a sheet or a film prepared by mold processing the polar resin (F) and/or the polyolefin (G), the polar resin (F) and/or the polyolefin (G) are contact-bonded with pressure through the molten adhesive (D) to prepare a multi-layered laminate. Furthermore, for a method for molding the laminate continuously, the polar resin (F) and/or the polyolefin (G) each are molten and laminated through the molten adhesive (D) in a molten state by a known molding method such as blow molding, injection molding or extrusion molding.

Examples of the laminate combination according to the present invention are three-layered laminates such as polyethylene terephthalate/adhesive/polyolefin, polylactic acid/adhesive/polyolefin, polycarbonate/adhesive/polyolefin and polyethylene terephthalate/adhesive/nylon 6; and five-layered laminates such as polycarbonate/adhesive/ethylene-vinyl alcohol copolymer/adhesive/polyolefin, polylactic acid/adhesive/ethylene-vinyl alcohol copolymer/adhesive/polyolefin, polyolefin/adhesive/polyethylene terephthalate/adhesive/polyolefin and polyolefin/adhesive/liquid crystal polyester/adhesive/polyolefin.

EXAMPLE

The present invention will be described in more detail with reference to the following examples, comparative examples and referential examples below. The present invention should not be limited by these examples.

(Various Measurement Methods)

In the examples, measurements were carried out in the following methods.

[Melt Flow Rate (MFR)]

The measurement was carried out at 190° C. under a load of 2.16 kg in accordance with ASTM D1238.

[Interlaminar Adhesion Strength of Film]

In a five-layered laminate of high density polyethylene/adhesive resin/polyethylene terephthalate (PET)/adhesive resin/high density polyethylene, the interlaminar adhesion strength between the PET layer and the adhesive layer was evaluated by a T-peeling method. The evaluation was carried out in a 23° C. atmosphere and in a 100° C. atmosphere using a tensile testing machine. The crosshead speed was 50 mm/min.

[Density]

The density was measured in accordance with JIS K7112.

[Flexural Modulus]

The flexural modulus was measured using a 4 mm thick press sheet in accordance with JIS K7171.

[Polyolefins Used]

The polyolefins used in the examples and comparative examples are shown below. Each polyolefin was prepared by polymerization in an ordinary method unless otherwise noted.

PE-1: Linear low density polyethylene (LLDPE) having a melt flow rate of 2.0 and a density of 0.922 g/cm$^3$.

PE-2: LLDPE having a melt flow rate of 2.0 and a density of 0.885 g/cm$^3$.

PE-3: High density polyethylene (HDPE) having a melt flow rate of 3.0 and a density of 0.963 g/cm$^3$.

PE-4: LLDPE having a melt flow rate of 2.0 and a density of 0.860 g/cm³.

Example 1

Preparation of Polyolefin (A) Having a Group Capable of Reacting with a Carbodiimide Group To 100 parts by weight of PE-1 (LLDPE manufactured by Mitsui Chemicals, Inc.), a solution prepared by dissolving 1 part by weight of maleic anhydride (abbreviated to MAH, manufactured by Wako Pure Chemical Industries, Ltd.) and 0.06 part by weight of 2,5-dimethyl-2,5-bis(t-butylperoxy) hexane (Trade Name Perhexa 25B, manufactured by NOF Co.) in acetone was dry-blended. Thereafter, using a twin screw kneading machine (TEX-30, manufactured by JSW Ltd.), the resulting mixture was extruded at a resin temperature 250° C., a screw rotation number of 200 rpm and an output rate of 100 g/min to prepare a maleic acid-modified polyethylene (abbreviated to MAH-PE). The resulting MAH-PE was dissolved in xylene and purified with re-precipitation in acetone. The grafted amount of maleic anhydride was found to be 0.96 wt % by measurement.

<Preparation of Adhesive>

To 10 parts by weight of "MAH-PE-1" prepared above, 80 parts by weight of PE-2 (LLDPE, manufactured by Mitsui Chemicals, Inc.) and 10 parts by weight of PE-3 (HDPE, manufactured by Mitsui Chemicals, Inc.) and further, based on the total amount of MAH-PE-1, PE-2 and PE-3, 3 parts by weight of polycarbodiimide (Trade Name: CARBODILITE HMV-8CA, manufactured by NISSHINBO INDUSTRIES, INC.) were blended and melt-kneaded at 250° C. at a retention time of 2 min using a 65 mmØ single screw extruder (manufactured by Modern Machinery Co., Ltd.) to prepare an adhesive.

<Preparation of Laminate>

For the polyester resin layer, a polyethylene terephthalate (Trade Name: MITSUI PET J125, manufactured by Mitsui Chemicals, Inc., abbreviated to PET hereinafter) was used.

For the polyolefin resin layer, HDPE having an MFR of 0.4 and a density of 0.950 g/cm³ was used.

Using a molding machine for preparing a five-layered laminate having four kinds of sheets (manufactured by EDI CO.), a laminate having a HDPE/adhesive resin/PET/adhesive resin/HDPE structure was prepared by co-extrusion molding. An HDPE layer extruder having a die of 50 mmØ, an adhesive resin layer extruder having a die of 40 mmØ and a PET layer extruder having a die of 30 mmØ were used and the sheets were taken up at a rate of 1 m/min to prepare a laminate consisting of HDPE/adhesive resin/PET/adhesive resin/HDPE layers each having 350/50/50/50/350 µm thickness.

<Evaluation on Adhesive Strength of Laminate>

The laminate prepared above was cut into a 15 mm wide specimen. The adhesive strength (unit: N/15 mm) in the interface between the polyester layer and adhesive layer of the specimen was measured at room temperature of 23° C. and 100° C. using a tensile test machine by the T peeling method. The crosshead speed was 50 mm/min.

TABLE 1

| Blending order | Example 1 | Example 2 | Comparative Example 1 | Comparative Example 2 | Comparative Example 3 |
|---|---|---|---|---|---|
| PE-1: MFR 2.0 g/10 min, density 0.922 g/cm³ | | 45 | 90 | | |
| PE-2: MFR 2.0 g/10 min, density 0.885 g/cm³ | 80 | 45 | | | 70 |
| PE-3: MFR 3.0 g/10 min, density 0.963 g/cm³ | 10 | | | | 10 |
| PE-4: MFR 2.0 g/10 min, density 0.860 g/cm³ | | | | 90 | |
| MAH-PE-1: density 0.922 g/cm³ | 10 | | 10 | 10 | 20 |
| MAH-PE-2: density 0.963 g/cm³ | | 10 | | | |
| Polycarbodiimide | 3 | 3 | 3 | 3 | 6 |
| Total of parts by weight | 103 | 103 | 103 | 103 | 106 |
| Density of Composition [g/cm³] | 0.896 | 0.909 | 0.922 | 0.866 | 0.900 |
| Ratio of Peak intensity at 2130-2140 cm⁻¹ to Peak intensity at 1470 cm⁻¹ (%) | 44 | 44 | 44 | 44 | 81 |
| Flexural Modulus of Composition [MPa] | 75 | 150 | 230 | 20 | 120 |
| Density of MAH-PO [g/cm³] | 0.922 | 0.963 | 0.922 | 0.922 | 0.922 |
| Peeling strength at 23° C. [N/15 mm] | 8 | 18 | 0.9 | 10 | 0.9 |
| Peeling strength at 100° C. [N/15 mm] | 3 | 10 | 8 | 0.6 | 0.1 |

Example 2 and Comparative Examples 1 to 3

In each example, the procedure of Example 1 was repeated in accordance the blending order as shown in Table 1 to prepare an adhesive (D). The physical properties of the resulting adhesive (D) and the measurement and evaluation results of a laminate formed are shown in Table 1.

Referential Example 1

Three sheets of 100 µm thick HDPE film were laminated and used to a 300 µm thick PO resin layer. A 100 µm thick press sheet was prepared from the adhesive resin of Example 1 and superimposed on the PO resin. Furthermore, "Lumirror S10" (polyethylene terephthalate film having a thickness of 300 µm, manufactured by TORAY INDUSTRIES, INC.) was superimposed on the PO resin and press-bonded in the following conditions to prepare a laminate.

Press conditions: press-bonding at a pressure of 50 kg/cm² for 2 min using a hot plate (240° C.).

The interlaminar adhesion strength of the laminate was 16 N/15 mm in a 23° C. atmosphere and it was 4 N/11 mm in a 100° C. atmosphere.

POSSIBILITY FOR INDUSTRIAL APPLICATION

According to the present invention, an adhesive having both of excellent adhesion strength at room temperature and excellent adhesion strength in a high temperature atmosphere can be prepared by allowing the polyolefin (A) having a group capable of reacting with a carbodiimide group to react with the carbodiimide group-containing compound (B) in the presence of the unmodified polyolefin (C).

Using the adhesive, it is possible to prepare a laminate having excellent interlaminar adhesion strength in a high temperature atmosphere.

Although the use of the laminate of the present invention is not particularly limited, the laminate can be used for the application which needs to have high temperature adhesion properties, for example, films for high temperature sterilization treatment such as food packaging films etc; packaging materials such as retort pouch etc; and food packaging cups etc.

The invention claimed is:

1. A multi-layered laminate obtainable by bonding a polar resin (F) and a polyolefin (G) or at least two kinds of polar resins (F) through an adhesive (D), wherein the adhesive (D) is obtainable by allowing a polyolefin (A) having a group capable of reacting with a carbodiimide group to react with a carbodiimide group-containing compound (B) in the presence of an unmodified polyolefin (C), which adhesive has a ratio of a peak intensity at 2130 to 2140 $cm^{-1}$ to a peak intensity at 1470 $cm^{-1}$, as determined by infrared absorbance analysis, of not more than 60% and a density of 0.870 $g/cm^3$ to 0.920 $g/cm^3$.

2. The multi-layered laminate according to claim 1, wherein the adhesive (D) has a flexural modulus of from 70 to 180 MPa.

3. The multi-layered laminate according to claim 1, wherein the polyolefin (A) having a group capable of reacting with a carbodiimide group has a density of from 0.915 to 0.980 $g/cm^3$.

4. The multi-layered laminate according to claim 1, wherein the adhesive (D) further comprises at least one substance (E) capable of giving tackiness selected from rosin derivatives, terpene resins, petroleum resins and hydrides thereof.

* * * * *